United States Patent
Lee et al.

(10) Patent No.: US 10,993,020 B2
(45) Date of Patent: *Apr. 27, 2021

(54) SPEAKER MODULE FOR MOBILE DEVICE AND MOBILE DEVICE HAVING DUCT RADIATION STRUCTURE

(71) Applicant: Samsung Electronics Co., Ltd., Suwon-si (KR)

(72) Inventors: Byounghee Lee, Seoul (KR); Kiwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,227

(22) Filed: Aug. 22, 2019

(65) Prior Publication Data

US 2019/0379966 A1    Dec. 12, 2019

Related U.S. Application Data

(63) Continuation of application No. 15/273,282, filed on Sep. 22, 2016, now Pat. No. 10,433,050, which is a
(Continued)

(30) Foreign Application Priority Data

Feb. 24, 2012    (KR) .................. 10-2012-0019346

(51) Int. Cl.
*H04R 1/02* (2006.01)
*H04R 1/28* (2006.01)
(Continued)

(52) U.S. Cl.
CPC ............ *H04R 1/288* (2013.01); *H04M 1/035* (2013.01); *H04R 1/00* (2013.01); *H04R 1/023* (2013.01);
(Continued)

(58) Field of Classification Search
CPC ...... H04R 1/023; H04R 1/086; H04R 1/2811; H04R 1/2857; H04R 1/288; H04R 1/345; H04R 2499/11; H04M 1/035
(Continued)

(56) References Cited

U.S. PATENT DOCUMENTS 5,909,490 A * 6/1999 Sokolich ............... H04M 1/035
379/433.02
6,002,949 A    12/1999 Hawker et al.
(Continued)

FOREIGN PATENT DOCUMENTS

CN    1384693 A    12/2002
CN    1666565 A    9/2005
(Continued)

OTHER PUBLICATIONS

"IPhone 3GS teardown, step 15," Ifixit, Jun. 14, 2009, https://www.ifixit.com/Teardown/iPhone+3GS+Teardown/817.
(Continued)

*Primary Examiner* — Huyen D Le
(74) *Attorney, Agent, or Firm* — Jefferson IP Law, LLP

(57) ABSTRACT

A speaker module for a mobile device is provided. The speaker module changes a shape of an opening surface of a duct to which a protection member for preventing a foreign substance from entering is attached. The speaker module includes a speaker for outputting a sound signal, a body in which the speaker is mounted, a duct connected to the body for forming a radiation path of a sound signal output from the speaker, and a protection member attached to an opening surface of the duct for preventing a foreign substance from entering the speaker module, wherein the opening surface has an area larger than that of a cross-sectional opening surface formed vertically with respect to a length direction of the duct.

18 Claims, 10 Drawing Sheets

Related U.S. Application Data continuation of application No. 13/770,628, filed on Feb. 19, 2013, now Pat. No. 9,479,850.

(51) Int. Cl.
| | | |
|---|---|---|
| *H04R 1/34* | (2006.01) | |
| *H04R 1/08* | (2006.01) | |
| *H04M 1/03* | (2006.01) | |
| *H04R 1/00* | (2006.01) | |

(52) U.S. Cl.
CPC .............. *H04R 1/025* (2013.01); *H04R 1/086* (2013.01); *H04R 1/28* (2013.01); *H04R 1/2811* (2013.01); *H04R 1/2857* (2013.01); *H04R 1/34* (2013.01); *H04R 1/345* (2013.01); *H04R 2499/11* (2013.01)

(58) Field of Classification Search
USPC ....... 381/337, 338, 345, 347, 350, 351, 386, 381/391, 189; 181/155, 156
See application file for complete search history.

(56) References Cited

U.S. PATENT DOCUMENTS

| | | | |
|---|---|---|---|
| 6,758,303 B2 | 7/2004 | Zurek et al. | |
| 6,763,110 B1 | 7/2004 | Sung | |
| 6,785,395 B1 | 8/2004 | Arneson et al. | |
| 7,233,678 B2 * | 6/2007 | Erixon .................. | H04M 1/035 381/345 |
| 7,869,617 B2 | 1/2011 | Jang et al. | |
| 7,953,461 B2 | 5/2011 | Fukazawa | |
| 8,055,003 B2 | 11/2011 | Mittleman et al. | |
| 9,479,850 B2 | 10/2016 | Lee et al. | |
| 10,433,050 B2 * | 10/2019 | Lee .................. | H04R 1/288 |
| 2003/0003945 A1 | 1/2003 | Saiki et al. | |
| 2005/0233781 A1 | 10/2005 | Erixon et al. | |
| 2006/0153417 A1 | 7/2006 | Furuya | |
| 2007/0189574 A1 | 8/2007 | Suzuki | |
| 2007/0223744 A1 | 9/2007 | Wada | |
| 2008/0166009 A1 | 7/2008 | Dinh et al. | |
| 2009/0137268 A1 | 5/2009 | Fukazawa et al. | |
| 2009/0291718 A1 | 11/2009 | Fukazawa | |
| 2010/0329496 A1 | 12/2010 | Mottonen et al. | |

FOREIGN PATENT DOCUMENTS

| | | |
|---|---|---|
| CN | 1719838 A | 1/2006 |
| CN | 101022680 A | 8/2007 |
| CN | 101151875 A | 3/2008 |
| CN | 101361400 A | 2/2009 |
| CN | 1666565 B | 6/2010 |
| EP | 1379101 A1 | 1/2004 |
| JP | 2006-019980 A | 1/2006 |
| JP | 2007-195011 A | 8/2007 |
| JP | 2007-256572 A | 10/2007 |
| JP | 4853029 B2 | 11/2011 |
| KR | 10-2011-0090697 A | 8/2011 |

OTHER PUBLICATIONS

"IPhone 3G and 3GS Complete Strip and Re-Build Repair Guide—www.AppleiPodParts.com," Dec. 12, 2011, https://www.youtube.com/watch?v=Ed80iXTToY0.

"IPhone 3GS Dock Sync Port Speaker Assembly Replacement Repair Instructions + Mic + Antenna," Aug. 21, 2010, https://www.youtube.com/watch?v=I0vpYm0s4zl.

"How to DIY replace a dock assembly in an iPhone 3G & iPhone 3GS," Jan. 7, 2012, https://www.youtube.com/watch?v=0E_WtK-Nd0.

"IPhone 3GS Dock Replacement 3G Antenna Microphone Tutorial | GadgetMenders.com," Mar. 9, 2012, https://www.youtube.com/watch?v=MZBAZq2PggY.

Korean Office Action dated Jan. 4, 2019, issued in Korean Patent Application No. 10-2012-0019346.

Chinese Office Action dated Mar. 21, 2019, issued in Chinese Patent Application No. 20170334216.5.

European Search Report dated May 9, 2019, issued in European Patent Application No. 18203487.6.

Chinese National Intellectual Property Administration Office Action dated Oct. 8, 2019, issued in Chinese Application No. 201710334216.5.

European Search Report dated Nov. 11, 2020, issued in European Application No. 20169331.4-1210 / 3748987.

\* cited by examiner

US 10,993,020 B2

SPEAKER MODULE FOR MOBILE DEVICE AND MOBILE DEVICE HAVING DUCT RADIATION STRUCTURE

CROSS-REFERENCE TO RELATED APPLICATION(S)

This application is a continuation application of prior application Ser. No. 15/273,282, filed Sep. 22, 2016, which is a continuation application of prior application Ser. No. 13/770,628, filed Feb. 19, 2013, which was based on and claimed priority under 35 U.S.C. § 119(a) of a Korean patent application number 10-2012-0019346, filed on Feb. 24, 2012, in the Korean Intellectual Property Office, the disclosures of each of which are incorporated by reference herein in its entireties.

BACKGROUND OF THE INVENTION

1. Field of the Invention

The present invention relates to a speaker module for a mobile device and a mobile device having a duct radiation structure. More particularly, the present invention relates to a speaker module for a mobile device and a mobile device having a duct radiation structure that can improve a sound performance by changing a shape of an opening surface of a duct to which a protection member for preventing a foreign substance from being injected is attached.

2. Description of the Related Art

Nowadays, due to the remarkable development of information and communication technology and semiconductor technology, the use of mobile devices has rapidly increased and become widespread. More particularly, a recent mobile device performs mobile convergence including a function of other terminals as well as each traditional intrinsic function. For example, a recent mobile communication terminal provides a multimedia function such as a television viewing function (e.g., mobile broadcasting such as Digital Multimedia Broadcasting (DMB) or Digital Video Broadcasting (DVB)), a music reproduction function (e.g., Motion Picture Experts Group (MPEG) Audio Layer-3 (MP3)), and a moving picture reproduction function, in addition to a general communication function such as voice communication and a character messaging service. As the multimedia use of mobile devices has grown, interest has correspondingly increased in a sound performance of a speaker module. Accordingly, the number of mobile devices using a speaker module having a duct radiation structure has also increased.

FIGS. 1A and 1B are a perspective view and a cross-sectional view illustrating an external appearance and a section of a speaker module having a duct radiation structure according to the related art.

Referring to FIGS. 1A and 1B, a speaker module 10 having a duct radiation structure includes a speaker 14 for outputting a sound signal, a body 11 in which the speaker 14 is mounted, a duct 12 extended from one surface of the body 11 for guiding a sound signal of the speaker 14 to be radiated to one surface, a soundproof member 15 attached to an opening surface of the duct 12, and a protection member 13 attached to the soundproof member 15 for preventing a foreign substance from entering the speaker module 10. It is preferable that the speaker module 10 has a size to improve a sound performance.

However, advances in technology have allowed recent mobile devices to be thinner Recent mobile devices also provide various functions according to a convergence trend. Because more capabilities are being provided in a smaller volume, it has become difficult for recent mobile devices to secure enough mounting space for the speaker module 10. That is, a size of the speaker module 10 is limited by the available space in the mobile device. When a sound signal is radiated to a side surface, as in the speaker module 10 shown in FIGS. 1A and 1B, a size of the duct 12 in which a sound signal is radiated is further limited. In this way, as a size of the duct 12 is limited, the speaker module 10 has difficulty in securing a satisfactory sound performance. When the protection member 13 for preventing a foreign substance from being injected is attached, it becomes difficult for the speaker module 10 to provide a satisfactory sound performance due to a sound pressure decrease by the protection member 13.

Therefore, a need exists for a system and method for an improved speaker module for a mobile device and a mobile device having a duct radiation structure.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a speaker module for a mobile device and a mobile device having a duct radiation structure that can minimize deterioration of a sound performance due to a protection member by changing a shape of a duct in order to increase an area of an opening surface of the duct from which a sound signal is radiated.

In accordance with an aspect of the present invention, a speaker module fastened to a mobile device is provided. The speaker module includes a speaker for outputting a sound signal, a body in which the speaker is mounted, a duct connected to the body for forming a radiation path of a sound signal output from the speaker, and a protection member attached to an opening surface of the duct for preventing a foreign substance from entering the speaker module, wherein the opening surface has an area larger than an area of a cross-sectional opening surface formed vertically with respect to a length direction of the duct.

In accordance with another aspect of the present invention, a speaker module fastened to a mobile device is provided. The speaker module includes a speaker for outputting a sound signal, a body in which the speaker is mounted, a duct connected to the body and including a first opening surface, a second opening surface, and a third opening surface, which are a radiation path of a sound signal output from the speaker, and a protection member attached to the second opening surface and for preventing a foreign substance from entering the speaker module, wherein the first opening surface is formed at one side end of the duct, the second opening surface is formed within the duct, the third opening surface is formed to expose the second opening surface, and an area of the second opening surface has an area larger than an area of a cross-sectional opening surface formed vertically with respect to a length direction of the duct.

In accordance with another aspect of the present invention, a speaker module fastened to a mobile device is provided. The speaker module includes a speaker for outputting a sound signal, a body in which the speaker is mounted, a duct connected to the body and having a first opening surface and a second opening surface for radiating a sound signal output from the speaker, and a protection member attached to enclose the first opening surface and the second opening surface for preventing a foreign substance from entering the speaker module, wherein the first opening surface is formed vertically or inclined with respect to a length direction of the duct, and the second opening surface is formed parallel to or inclined to a length direction of the duct.

In accordance with another aspect of the present invention, a mobile device having a duct radiation structure is provided. The device includes a case in which a speaker module including a first duct for forming a radiation path of a sound signal is mounted, and a second duct formed in the case for radiating a sound signal of the speaker module to the outside, wherein the second duct includes a protection member for preventing a foreign substance from entering the speaker module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile device according to an exemplary embodiment of the present invention is a small-sized terminal including a speaker module, and includes a mobile communication terminal, a Personal Digital Assistant (PDA), a smart phone terminal, a Moving Picture Experts Group (MPEG) audio layer-3 (MP3) player, and a Portable Multimedia layer (PMP).

Figure 1A:
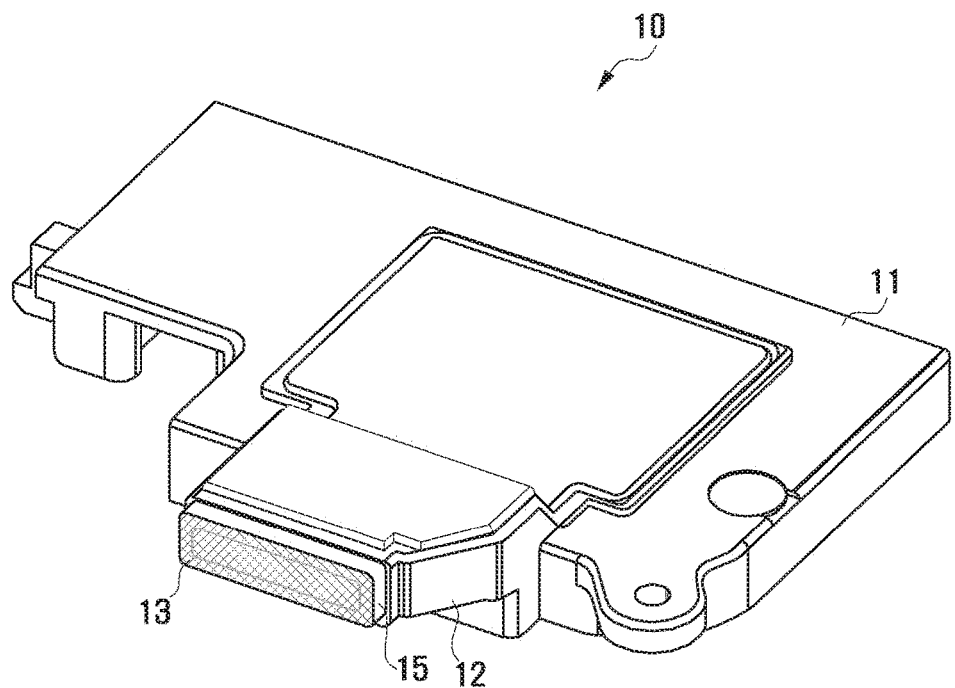
FIGS. 1A and 1B are a perspective view and a cross-sectional view illustrating an external appearance and a section of a speaker module having a duct radiation structure according to the related art.
Figure 1B:
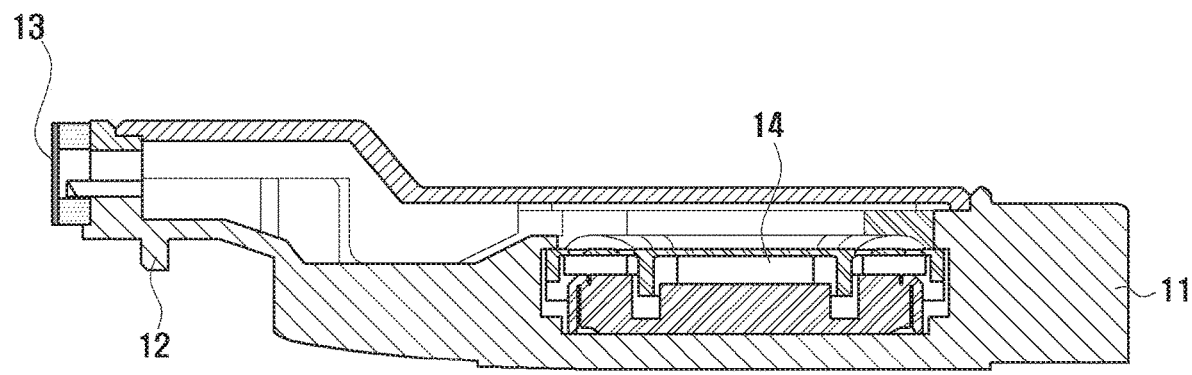
Figure 2:
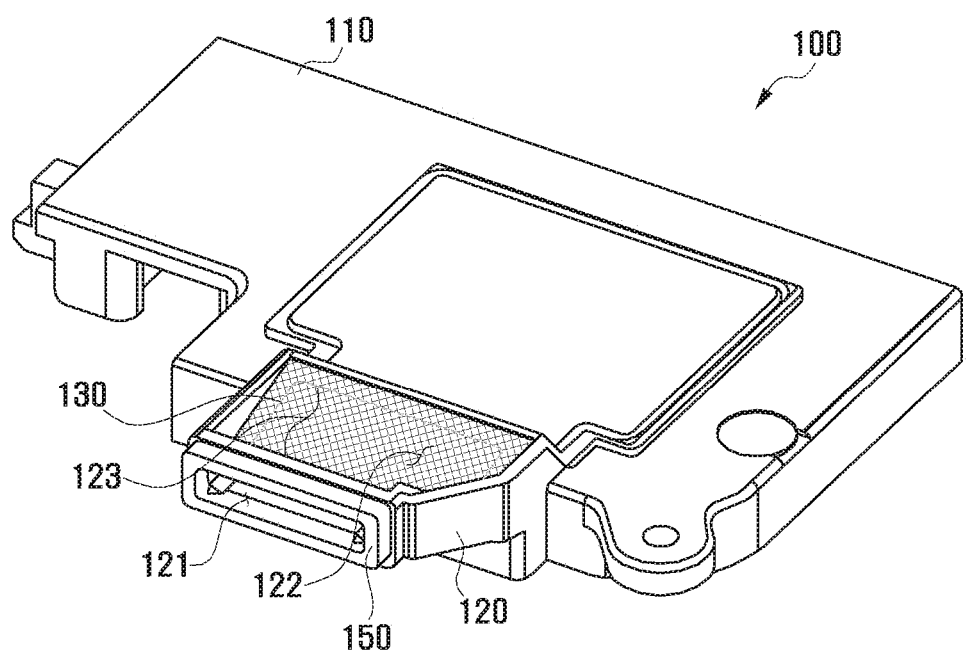
FIG. 2 is a perspective view illustrating an external appearance of a speaker module according to a first exemplary embodiment of the present invention.
Figure 3:
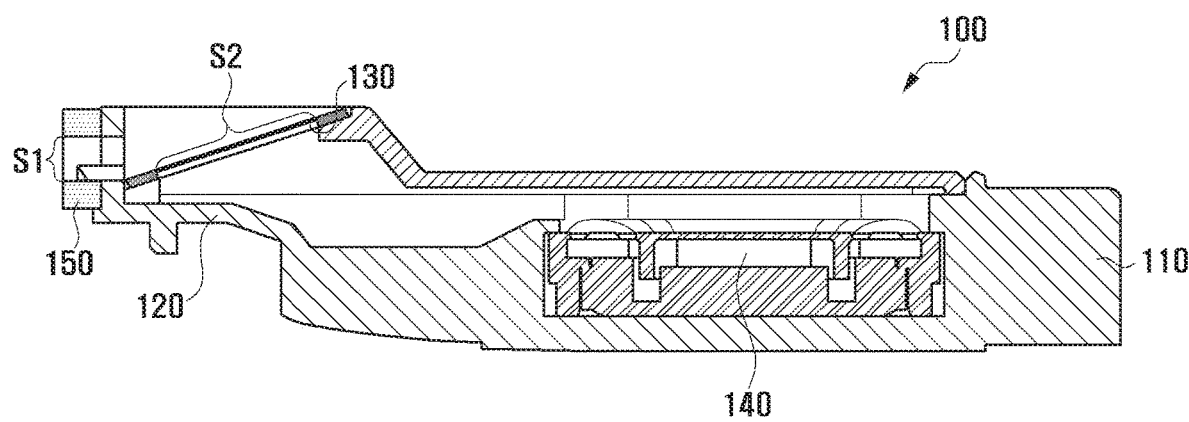
FIG. 3 is a cross-sectional view illustrating a speaker module according to the first exemplary embodiment of the present invention.

FIG. 2 is a perspective view illustrating an external appearance of a speaker module according to a first exemplary embodiment of the present invention. FIG. 3 is a cross-sectional view illustrating a speaker module according to the first exemplary embodiment of the present invention.

Referring to FIGS. 2 and 3, a speaker module 100 according to the first exemplary embodiment of the present invention includes a body 110, a duct 120, a protection member 130, a speaker 140, and a soundproof member 150.

The speaker 140 is mounted within the body 110, and a sound signal output from the speaker 140 may be radiated to the outside through a passage formed with the body 110 and the duct 120. That is, a sound signal output from the speaker 140 may be radiated to the outside through an opening surface of the duct 120. Particularly, the duct 120 according to the first exemplary embodiment of the present invention includes a first opening surface 121, a second opening surface 122, and a third opening surface 123. The first opening surface 121 is formed in various forms (e.g., a stepwise form) such as a vertical form or a form inclined with respect to a length direction of the duct 120. The second opening surface 122 is formed at one side end of the duct 120. The third opening surface 123 is formed to expose the second opening surface 122. Specifically, the second opening surface 122 is formed to have an area larger than that of a cross-sectional opening surface formed vertically with respect to a length direction of the duct 120.

The first opening surface 121 is in contact with a hole (not shown, hereinafter, a speaker hole) formed in a case of a mobile device (not shown). That is, a sound signal output from the speaker 140 is radiated to the outside of a mobile device (not shown) through a speaker hole. In this case, the soundproof member 150 for preventing leakage of a sound signal is positioned between the speaker hole and the first opening surface 121. The soundproof member 150 may be formed of various appropriate materials such as sponge, poron, and rubber.

The second opening surface 122 is a surface to which a protection member 130 for preventing a foreign substance from entering the speaker module is attached, and it is preferable that an area S2 of the second opening surface 122 be larger than an area S1 of the first opening surface 121. The protection member 130 may be formed with mesh and non-woven cloth. An audio signal passes through the protection member 130 with low sound signal transfer resistance. A plurality of holes (i.e., net knot) are formed in the protection member 130. In order to enhance a foreign substance prevention effect, it is preferable that a size of a hole of the protection member 130 be small. However, as a size of the hole reduces, the sound signal transfer resistance increases.

The third opening surface 123 is formed to easily attach the protection member 130 to the second opening surface 122.

As described above, as a structure of the duct 120 of the speaker module 100 is changed, the speaker module 100 according to the first exemplary embodiment of the present invention can reduce sound pressure deterioration due to the protection member 130, compared with the speaker module 10 of the related art. This is because an area of an opening surface to which the protection member 130 is attached is large compared with a case of the relate art and thus as a sound signal is radiated through a wide area, the transfer resistance to a sound signal passing through the protection member 130 is relatively small.

Figure 4:
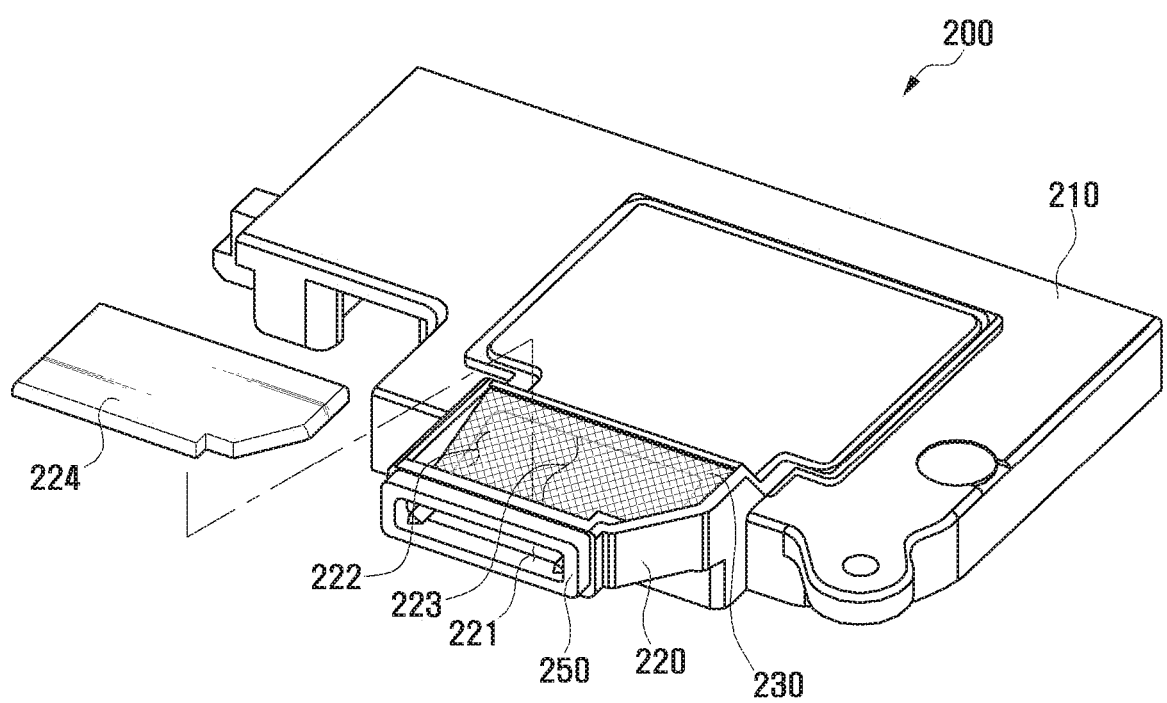
FIG. 4 is a perspective view illustrating an external appearance of a speaker module according to a second exemplary embodiment of the present invention.
Figure 5:
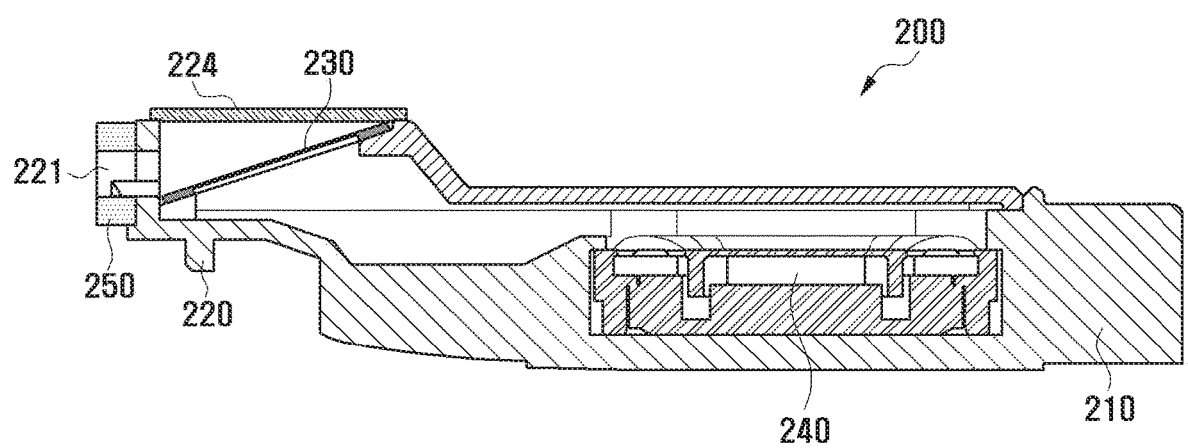
FIG. 5 is a cross-sectional view illustrating a speaker module according to the second exemplary embodiment of the present invention.

FIG. 4 is a perspective view illustrating an external appearance of a speaker module according to a second exemplary embodiment of the present invention. FIG. 5 is a cross-sectional view illustrating a speaker module according to the second exemplary embodiment of the present invention.

Referring to FIGS. 4 and 5, a speaker module 200 according to the second exemplary embodiment of the present invention includes a body 210, a duct 220, a protection member 230, a speaker 240, and a soundproof member 250. The speaker module 200 according to the second exemplary embodiment of the present invention is similar to the speaker module 100 according to the first exemplary embodiment. However, the speaker module 200 according to the second exemplary embodiment of the present invention includes a soundproof cover 224 fastened to the third opening surface 223. The soundproof cover 224 prevents a sound signal from being distributed and output to a third opening surface 223. That is, the speaker module 200 according to the second exemplary embodiment of the present invention prevents performance deterioration of a sound signal occurring as the sound signal is distributed and output to the first opening surface 221 and the third opening surface 223.

In FIGS. 4 and 5, a soundproof cover 224 is formed separately, but the present invention is not limited thereto. For example, the soundproof cover 224 may be integrally formed with another part which is one of constituent elements of the speaker module 200. Alternatively, the third opening surface 223 may be soundproof-processed by body of the mobile device. For this, the body of the mobile device may include a constituent element (e.g., a bracket) for blocking the third opening surface 223. In this case, by attaching a soundproof member (e.g., poron and sponge) between the constituent element and the third opening surface 223, a soundproof effect can be increased. Alternatively, in another exemplary embodiment of the present invention, by not separately forming a constituent element for blocking the third opening surface 223 in the body of the mobile device and by attaching a soundproof member between the body of the mobile device and the third opening surface 223, a soundproof process may be performed.

In FIGS. 2 to 5, one protection member is attached to the second opening surfaces 122 and 222, but the present invention is not limited thereto. That is, in another exemplary embodiment of the present invention, one or more protection members may be attached to the speaker modules 100 and 200. For example, a protection member may be further attached to the first opening surfaces 121 and 221 of the speaker modules 100 and 200. In this case, the protection member attached to the first opening surfaces 121 and 221 may be more sparsely spaced than, i.e., may have a hole size larger than, a protection member attached to the second opening surfaces 122 and 222. Alternatively, when an area of the first opening surfaces 121 and 221 and the second opening surfaces 122 and 222 is larger than that of a cross-sectional opening surface formed vertically with respect to a length direction of the duct, a protection member attached to the first opening surfaces 121 and 221 and the second opening surfaces 122 and 222 may have the same hole size.

Figure 6A:
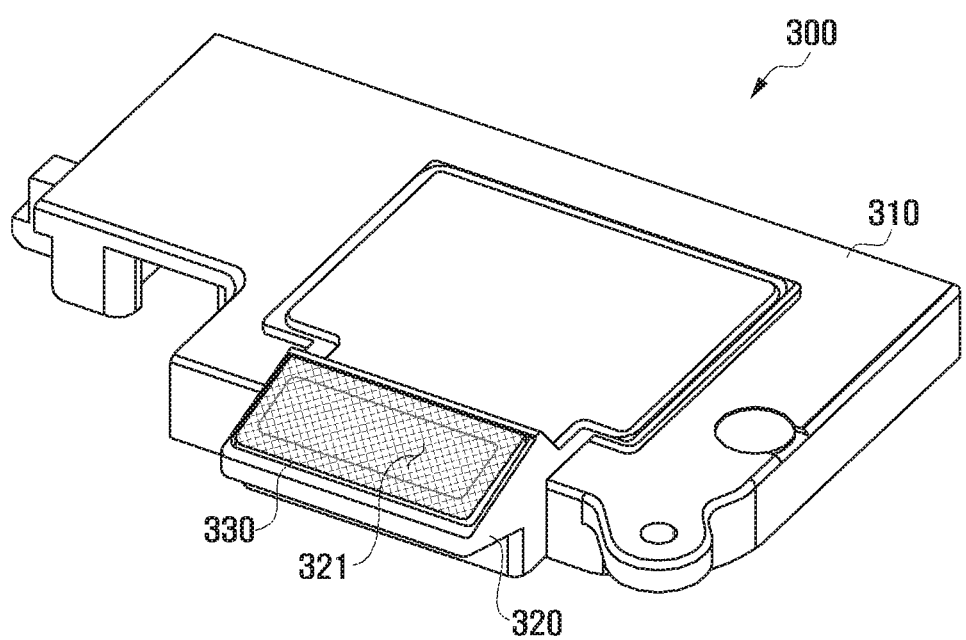
FIGS. 6A and 6B are a perspective view and a cross-sectional view illustrating an external appearance and a section of a speaker module according to a third exemplary embodiment of the present invention.
Figure 6B:
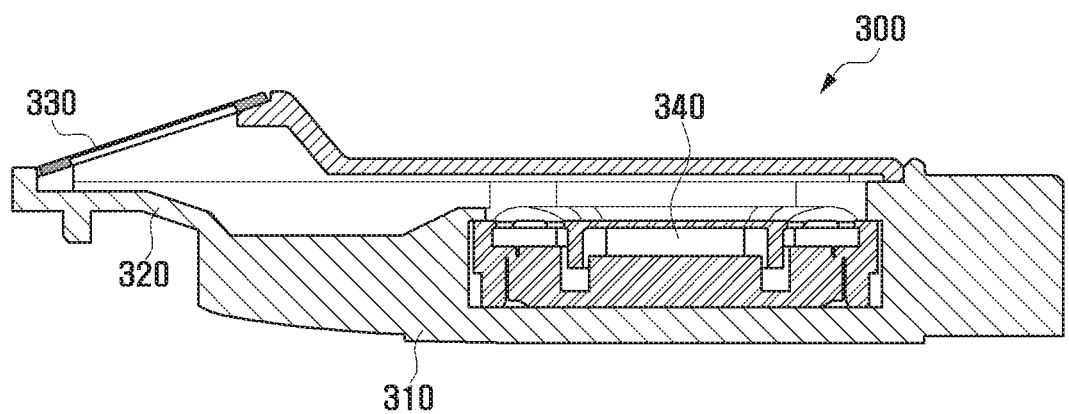

FIGS. 6A and 6B are a perspective view and a cross-sectional view illustrating an external appearance and a section of a speaker module according to a third exemplary embodiment of the present invention.

Referring to FIGS. 6A and 6B, a speaker module 300 according to the third exemplary embodiment of the present invention includes a speaker 340 for outputting a sound signal, a body 310 in which the speaker 340 is mounted, a duct 320 for forming a radiation path of a sound signal output from the speaker 340, and a protection member 330 attached to an opening surface 321 of the duct 320.

The speaker module 300 according to the third exemplary embodiment of the present invention has an opening surface 321, unlike the speaker modules 100 and 200 according to the first exemplary embodiment and the second exemplary embodiment. In this case, the opening surface 321 is not formed vertically with respect to a length direction of the duct 320. This is to enable the opening surface 321 to have an area larger than that of a cross-sectional opening surface formed vertically with respect to a length direction of the duct 320. For example, when a length direction of the duct 320 is assumed to '0°', the opening surface 321 of the duct 320 may be formed to have a tilt angle, essentially any angle except for '90°' and '270°', which are angles having a minimum sectional area, and '180°' and '360°', which are angles parallel to a length direction of the duct 320.

The speaker module 300 according to the third exemplary embodiment of the present invention has one opening surface, unlike the speaker modules 100 and 200 according to the first exemplary embodiment and the second exemplary embodiment respectively, and thus the protection member 330 is more easily attached.

The speaker module 300 is fastened to the body of the mobile device. In this case, a sound signal of the speaker module 300 is radiated to the outside through a speaker hole formed in a side surface of the body of the mobile device. However, as the opening surface 321 has a tilt, the opening surface 321 and the body of the mobile device do not fully contact each other, and a gap may be formed between the opening surface 321 and the body of the mobile device. Due to the gap, all sound signals are not output to the outside through a speaker hole, and some sound signal may be leaked. In order to prevent the leakage of such a sound signal, the body of the mobile device includes a duct structure (not shown, hereinafter, a second duct) coupled to the duct 320 (hereinafter, a first duct) of the speaker module 300. That is, as a second duct coupled to the first duct 320 is provided in the body of the mobile device, a sound signal output from the speaker module 300 may be radiated to the outside without leakage. In this way, when the second duct is formed in the body of the mobile device, the protection member 330 may be attached to an opening surface of the second duct. The opening surface of the second duct is opposite to the opening surface of the first duct 320.

In FIGS. 6A and 6B, one side end of the duct 320 to which the protection member 330 is attached has a tilt, but one side end of the duct 320 of the speaker module 300 may be formed in various forms having a surface larger than an opening surface of the speaker apparatus 10 of the related art. For example, one side end of the duct 320 of the speaker module 300 may be formed in a protruded form while having a tilt such as '<' and '>' or in a protruded form while having a curvature such as '(' and ')'. Alternatively, by forming one side end of the duct 320 to which the protection member 330 is attached in a stepwise form, an area to which the protection member 330 is attached may be increased. One side end structure of the duct 320 may be applied to the foregoing first and second exemplary embodiments of the present invention, and to the third exemplary embodiment through a fifth exemplary embodiment to be described later.

Figure 7A:
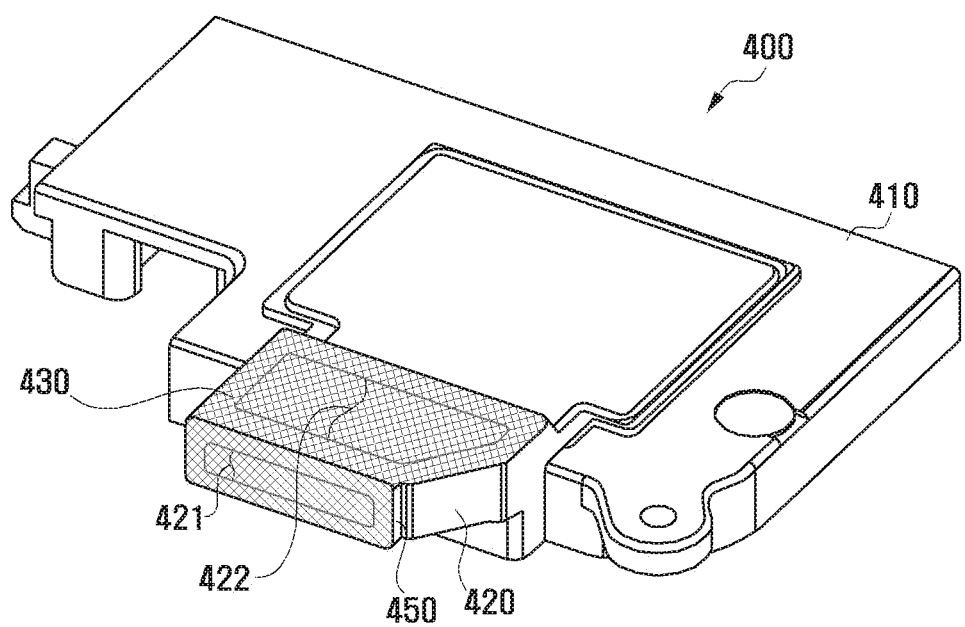
FIGS. 7A and 7B are a perspective view and a cross-sectional view illustrating an external appearance and a section of a speaker module according to a fourth exemplary embodiment of the present invention.
Figure 7B:
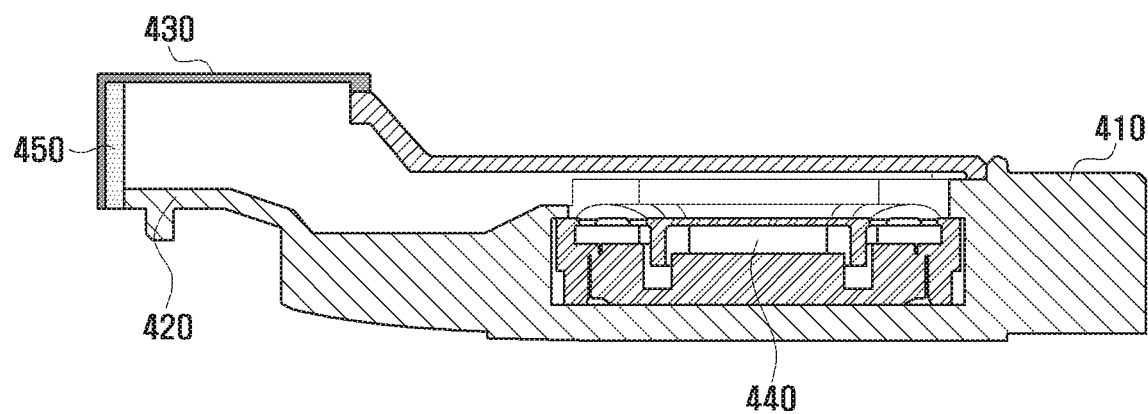

FIGS. 7A and 7B are a perspective view and a cross-sectional view illustrating an external appearance and a section of a speaker module according to a fourth exemplary embodiment of the present invention.

Referring to FIGS. 7A and 7B, a speaker module 400 according to the fourth exemplary embodiment of the present invention includes a speaker 440 for outputting a sound signal, a body 410 in which the speaker 440 is mounted, a duct 420 for forming a radiation path of a sound signal output through the speaker 440, and a protection member 430 attached to the duct 420 to prevent a foreign substance from entering the speaker module.

The duct 420 includes a first opening surface 421 vertically formed at one side of the duct 420, and a second opening surface 422 formed parallel to a length direction of the duct 420. The protection member 430 is attached to enclose the first opening surface 421 and the second opening surface 422.

The speaker module 400 according to the fourth exemplary embodiment of the present invention has one or more opening surfaces, and as the protection member 430 is attached to the one or more opening surfaces, a sound performance (sound pressure) is prevented from being deteriorated by the protection member 430. That is, the speaker module 400 according to the fourth exemplary embodiment of the present invention does not attach a protection member to one opening surface having a narrow area like the related art but instead forms one or more opening surfaces, and thus a protection member may be attached to a relatively wide area compared to the related art, thereby minimizing deterioration of a sound performance due to the protection member.

The speaker module 400 is fastened to the body of the mobile device. When the speaker module 400 is fastened to the body of the mobile device, a sound signal of the speaker 440 is radiated to the outside of the speaker module 400 through the first opening surface 421 and the second opening surface 422 of the duct 420, and is radiated to the outside through a speaker hole formed at one side (e.g., a side surface) of the body of the mobile device. In this case, when the second opening surface 422 is blocked by the body of the mobile device, a sound signal is radiated through only the first opening surface 421, and thus the same problem as that of the related art occurs. In order to prevent this, it is preferable that the body of the mobile device be formed so as to not block the second opening surface 422 of the speaker module 400. For example, the body of the mobile device may include a device (e.g., a duct, a gap) for transferring a sound signal output through the second opening surface 422 to the speaker hole. Further, it is preferable that an upper end area of a soundproof member 450 is removed. This is to prevent a problem that a sound signal radiated through the second opening surface 422 is not transferred to the outside through the speaker hole of the case by the soundproof member 450.

Figure 8A:
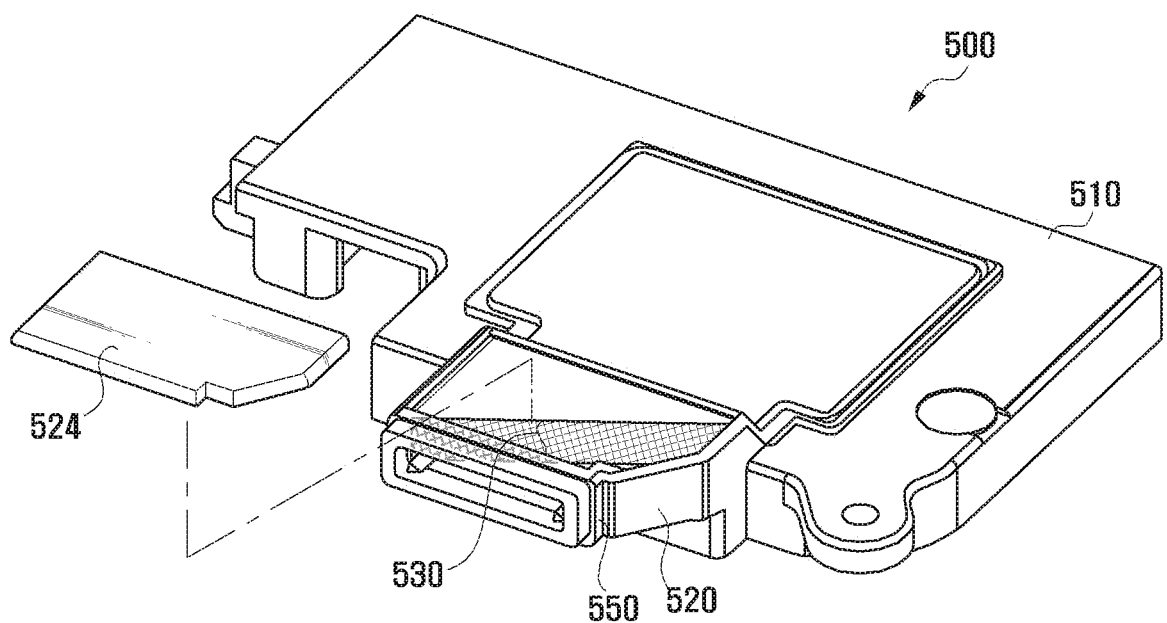
FIGS. 8A and 8B are a perspective view and a cross-sectional view illustrating an external appearance and a section of a speaker module according to a fifth exemplary embodiment of the present invention.
Figure 8B:
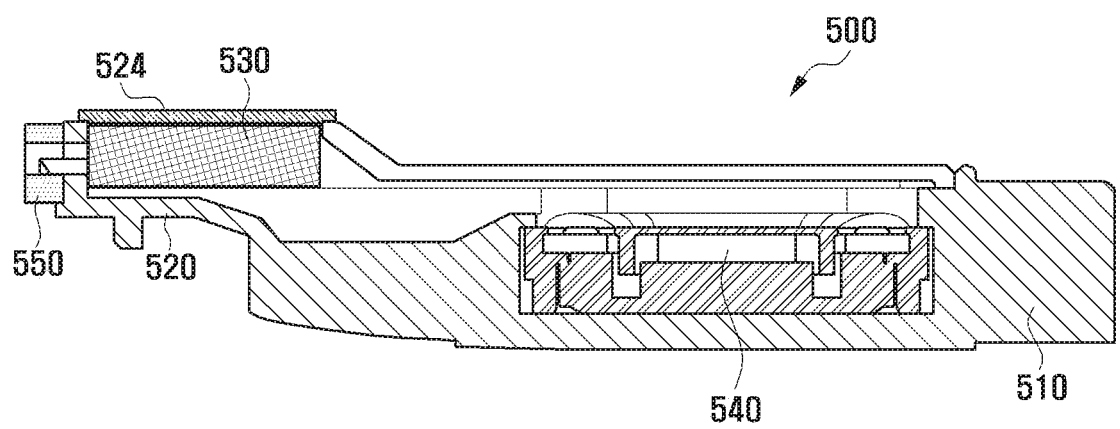

FIGS. 8A and 8B are a perspective view and a cross-sectional view illustrating an external appearance and a section of a speaker module according to a fifth exemplary embodiment of the present invention.

Referring to FIGS. 8A and 8B, a speaker module 500 according to the fifth exemplary embodiment of the present invention includes a body 510, a duct 520, a protection member 530, a speaker 540, and a soundproof member 550.

The speaker module 500 according to the fifth exemplary embodiment of the present invention has a structure similar to that of the speaker modules 100 and 200 according to the first exemplary embodiment and the second exemplary embodiment, respectively. The speaker module 500 according to the fifth exemplary embodiment of the present invention includes a soundproof cover 524 fastened to an opening surface above protection member 530. The soundproof cover 524 prevents a sound signal from being distributed and output to the opening surface above protection member 530. However, the protection member 530 is attached in different forms than in the previous embodiments. Specifically, in the first exemplary embodiment and the second exemplary embodiment, the protection members 130 and 230 have a vertical tilt, but the protection member 530 of the speaker module 500 according to the fifth exemplary embodiment has a tilt in a horizontal direction, as shown in FIGS. 8A and 8B. In FIGS. 8A and 8B, the speaker module 500 includes one protection member 530, but the present invention is not limited thereto. That is, as described above, the speaker module 500 may include a plurality of protection members.

Figure 9:
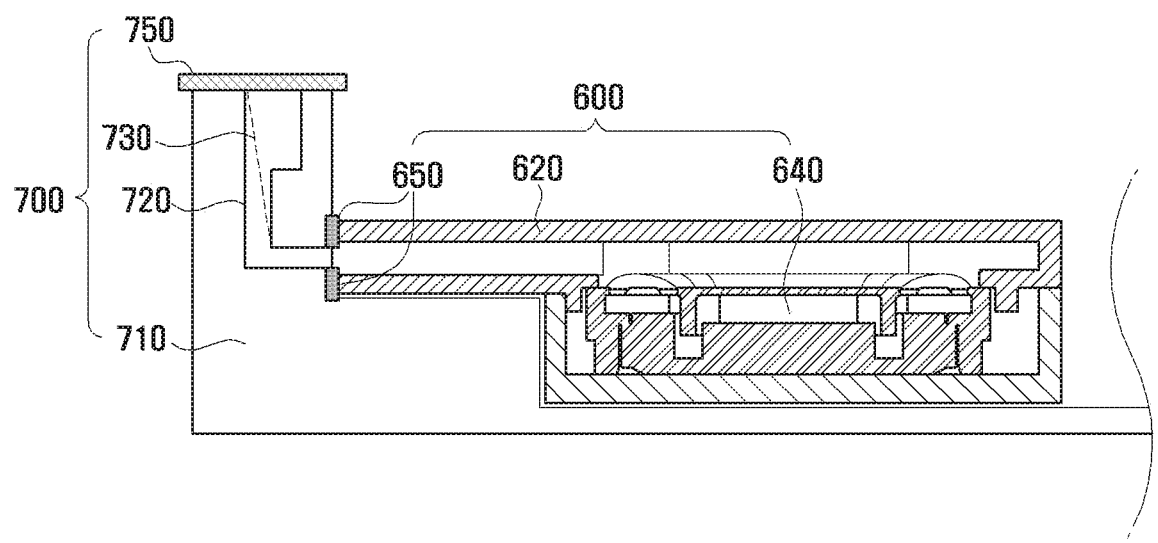
FIG. 9 is a cross-sectional view illustrating a fastened shape of a speaker module and a mobile device having a duct radiation structure according to an exemplary embodiment of the present invention.

FIG. 9 is a cross-sectional view illustrating a fastened shape of a speaker module and a mobile device having a duct radiation structure according to an exemplary embodiment of the present invention.

Referring to FIG. 9, a mobile device 700 according to an exemplary embodiment of the present invention includes a body 710 in which a speaker module 600 is mounted and a second duct 720 formed in the body 710 for radiating a sound signal of the speaker module 600 to the outside. The mobile device 700 according to an exemplary embodiment of the present invention includes a protection member 730 for preventing a foreign substance from entering the inside of the second duct 720.

The second duct 720 includes a first opening surface contacting with a first duct 620, a second opening surface formed within the second duct 720 and to which the protection member 730 is attached, and a third opening surface positioned at an opposite side surface of the first opening surface for radiating a sound signal to the outside. Further, the mobile device 700 includes a soundproof member 650 positioned between the first opening surface of the second duct 720 and an opening surface of the first duct 620 for transferring a sound signal output from a speaker 640 without leakage from the first duct 620 to the second duct 720. The mobile device 700 may include a plurality of protection members. For example, the mobile device 700 may further attach a protection member 750 to the third opening surface. In this case, the protection member 750 attached to the third opening surface may have a hole size greater than or equal to the protection member 730 attached to the inside of the second duct 720.

Figure 10A:
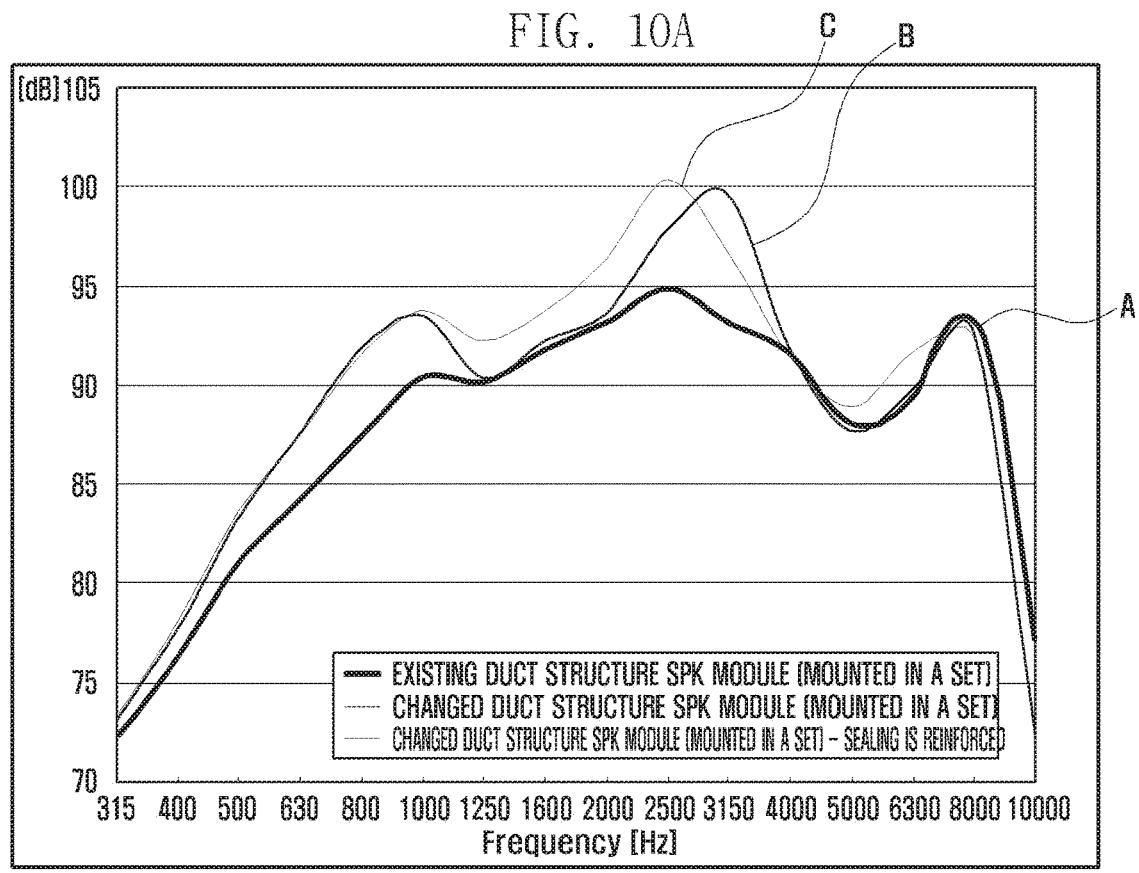
FIGS. 10A and 10B are graphs illustrating sound performance measurement results of a speaker module of the related art and speaker modules of exemplary embodiments of the present invention.
Figure 10B:
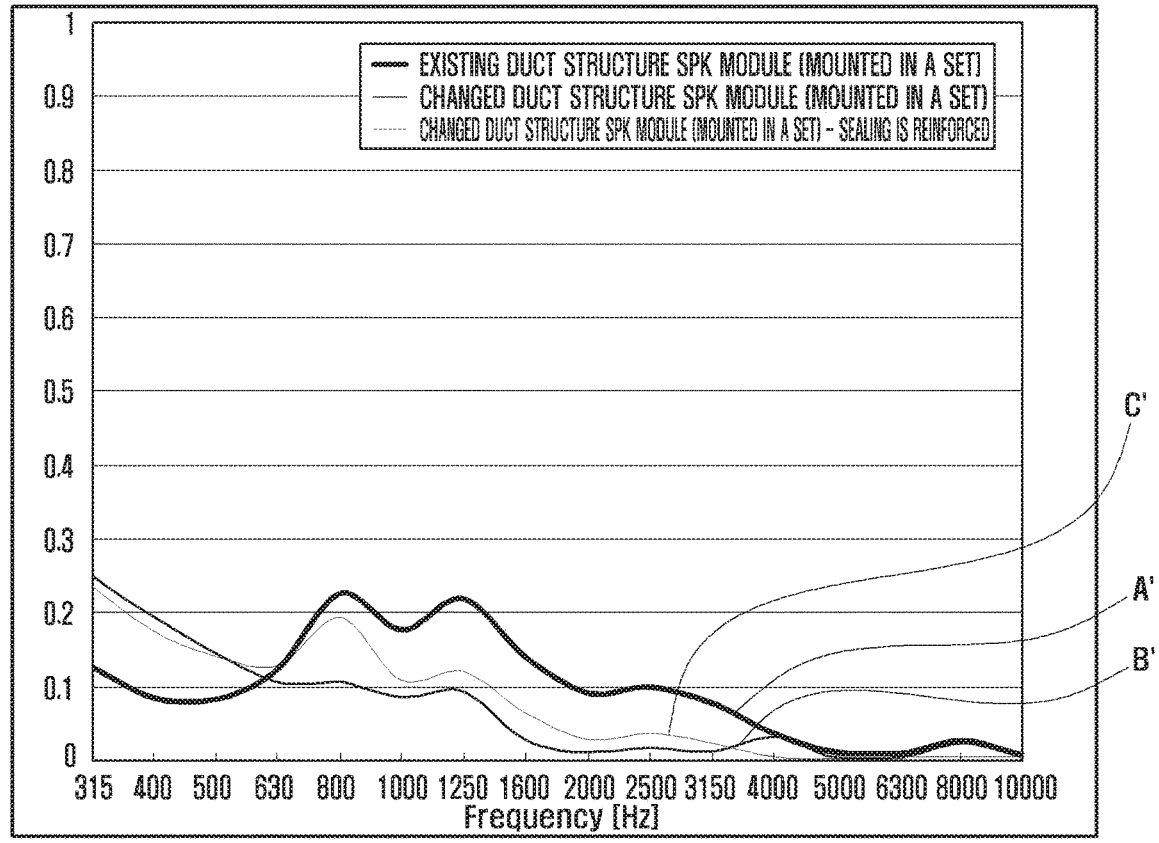

FIGS. 10A and 10B are graphs illustrating a sound performance measurement result of a speaker module of the related art and speaker modules of exemplary embodiments of the present invention. FIG. 10A is a graph illustrating a sound pressure measurement result of each speaker module, and FIG. 10B is a graph illustrating a Total Harmonic Distortion (THD) measurement result of each speaker module. When a sine wave which is a single frequency is input, THD is a ratio of the level sum of a harmonic component included in an output signal and an output signal level. That is, as a THD value is low, a performance of the speaker is good.

Referring to FIG. 10A, a first graph A is a sound pressure graph of the speaker module 10 of the related art, a second graph B is a sound pressure graph of the speaker module 100 according to the first exemplary embodiment of the present invention, and a third graph C is a sound pressure graph of the speaker module 200 according to the second exemplary embodiment of the present invention. When comparing the first graph A to the third graph C, it can be seen that a sound pressure of the speaker modules 100 and 200 according to exemplary embodiments of the present invention is generally increased, compared with the speaker module 10 of the related art. More specifically, it can be seen that the speaker modules 100 and 200 according to exemplary embodiments of the present invention are similar in a frequency band, or a sound pressure of about 1 decibel (dB) to 6 dB is increased, compared with the speaker module 10 of the related art. Further, when comparing the second graph B and the third graph C, it can be seen that a sound pressure of the speaker module 200 according to the second exemplary embodiment is further increased in an intermediate and large band, from about 900 Hertz (Hz) to about 3000 Hz and again from about 4500 Hz to about 7500 Hz, compared with the speaker module 100 according to the first exemplary embodiment.

A fourth graph A' is a THD graph of the speaker module 10 of the related art, a fifth graph B' is a THD graph of the speaker module 100 according to the first exemplary embodiment of the present invention, and a sixth graph C' is a THD graph of the speaker module 200 according to the second exemplary embodiment of the present invention. When comparing with the fourth graph A' to the sixth graph C', it can be seen that the speaker modules 100 and 200 according to exemplary embodiments of the present invention are generally lower in THD than the speaker module 10 of the related art. This means that a level of a harmonic component included in a signal output from the speaker modules 100 and 200 according to exemplary embodiments of the present invention is low. That is, it can be seen that a performance of the speaker modules 100 and 200 according to exemplary embodiments of the present invention is improved, compared with the speaker module 10 of the related art.

FIGS. 10A and 10B illustrate measurement results of the speaker modules 100 and 200 according to only the first exemplary embodiment and the second exemplary embodiment of the present invention. However, a performance of the speaker modules 300, 400, and 500 according to the third, fourth, and fifth exemplary embodiments of the present invention, and the speaker module 600 fastened to a mobile device having a duct radiation structure described in FIG. 9, is similarly improved in comparison to the speaker module 10 of the related art.

In the foregoing description, it has been described that a protection member is attached to a duct formed in a speaker module or a mobile device body. However, the present invention is not limited thereto. For example, in an exemplary embodiment of the present invention, a protection member may be doubly attached. That is, in an exemplary embodiment of the present invention, a protection member may be attached to a duct and a speaker hole of a body of a mobile device. In this case, it is preferable to attach a protection member in which a size of a hole is relatively large to the speaker hole and the duct. Alternatively, in a structure of the first exemplary embodiment and the second exemplary embodiment of the present invention, a protection member may be doubly attached to a first opening surface and a second opening surface. In this way, according to the present invention, by attaching a protection member having a relatively large hole size to an opening surface, sound pressure deterioration by a protection member is reduced, and by attaching a plurality of protection members, due to an increased area of a hole size of the protection member, a possibility of a foreign substance entering the speaker module can be minimized.

As described above, a speaker module for a mobile device and a mobile device having a duct radiation structure according to an exemplary embodiment of the present invention can increase an area of an opening surface to which a protection member is attached by changing a shape of a duct in which a sound signal is radiated. In this way, as an area of the opening surface is increased, a sound performance deterioration problem by the protection member can be improved. That is, a sound performance of the speaker module can be improved.

While the invention has been shown and described with reference to certain exemplary embodiments thereof, it will be understood by those skilled in the art that various changes and form and details may be made therein without departing from the spirit and scope of the invention as defined in the appended claims and their equivalents.

What is claimed is:

1. A mobile communication device comprising:
  a speaker module; and
  a body of the mobile communication device to which the speaker module is fastened,
  wherein the speaker module comprises:
    a first body portion including a recess formed in at least one part of the first body portion,
    a speaker disposed in the recess such that a sound outputting side of the speaker is exposed, and a second body portion coupled to the first body portion on which the speaker is disposed, wherein the first body portion and the second body portion form a passage configured to block sound output from the speaker disposed in the recess from propagating in a first body portion direction and a second body portion direction, and to propagate sideways along the passage in an opening direction formed at an end of the passage, the opening being tilted relative to a direction of the passage, and wherein the opening is configured to pass sound output from the sound outputting side to an exterior of the speaker module.

2. The mobile communication device of claim 1, further comprising:

a protector disposed on the first body portion and the second body portion at the opening, an area of the protector being larger than a cross-sectional area of the passage at the end thereof.

3. The mobile communication device of claim 2, wherein the protector is disposed between the body of the mobile communication device and the opening of the speaker module by fastening the speaker module to the body of the mobile communication device.

4. The mobile communication device of claim 1, wherein the first body portion and the second body portion comprise different lengths at the opening such that the opening is inclined relative to at least one of the first body portion or the second body portion.

5. The mobile communication device of claim 1, wherein the first body portion and the second body portion respectively comprise soundproof members for blocking sound.

6. The mobile communication device of claim 5, wherein the first body portion and the second body portion are coupled to each other to form the passage such that sound output for the speaker is blocked at another end of the passage except for the opening.

7. The mobile communication device of claim 1, wherein the opening comprises a curvature or a stepwise form.

8. The mobile communication device of claim 1, wherein the speaker module is attached to the body of the mobile communication device.

9. The mobile communication device of claim 8, further comprising:

another passage formed through the body of the mobile communication device, wherein the passage and the other passage are coupled at the opening of the passage such that the passage and the other passage form a continuous path for passing sound.

10. The mobile communication device of claim 8, further comprising a soundproof member disposed between the body of the mobile communication device and the passage at the opening and configured to prevent sound from leaking.

11. A speaker module configured for installation in an electronic device, the speaker module comprising:

a first body portion including a recess formed in at least one part of the first body portion;

a speaker disposed in the recess such that a sound outputting side of the speaker is exposed; and a second body portion coupled to the first body portion on which the speaker is disposed, wherein the first body portion and the second body portion form a passage configured to block sound output from the speaker disposed in the recess from propagating in a first body portion direction and a second body portion direction, and to propagate sideways along the passage in an opening direction formed at an end of the passage, the opening being tilted relative to a direction of the passage, wherein the opening is configured to pass sound output from the sound outputting side to an exterior of the speaker module, and wherein the first body portion and the second body portion together are configured to block sound output from the sound outputting side of the speaker except through the opening.

12. The speaker module of claim 11, further comprising:

a protector disposed on the first body portion and the second body portion at the opening, an area of the protector being larger than a cross-sectional area of the passage at the end thereof.

13. The speaker module of claim 11, wherein the first body portion and the second body portion comprise different lengths at the opening such that the opening is inclined relative to at least one of the first body portion or the second body portion.

14. The speaker module of claim 11, wherein the first body portion and the second body portion respectively comprise soundproof members for blocking sound.

15. The speaker module of claim 11, wherein the first body portion and the second body portion are coupled to each other to form the passage such that sound output for the speaker is blocked at another end of the passage except for the opening.

16. The speaker module of claim 11, wherein the opening comprises a curvature or a stepwise form.

17. The speaker module of claim 11, wherein a soundproof member is disposed between a body of the electronic device and the passage at the opening and is configured to prevent sound from leaking.

18. The speaker module of claim 11, wherein at least one of the first body portion or the second body portion comprises an attachment structure formed as at least a part of the first body portion or the second body portion, and wherein the attachment structure is configured to attach the speaker module to a body of the electronic device.

* * * * *